United States Patent
Hammerschmidt et al.

(10) Patent No.: US 8,077,025 B2
(45) Date of Patent: Dec. 13, 2011

(54) INTELLIGENT TIRE SYSTEMS AND METHODS

(75) Inventors: Dirk Hammerschmidt, Villach (AT); Jakob Jongsma, Graz (AT)

(73) Assignee: Infineon Technologies, AG, Neubiberg (DE)

( * ) Notice: Subject to any disclaimer, the term of this patent is extended or adjusted under 35 U.S.C. 154(b) by 384 days.

(21) Appl. No.: 11/856,748

(22) Filed: Sep. 18, 2007

(65) Prior Publication Data

US 2009/0072958 A1 Mar. 19, 2009

(51) Int. Cl.
*B60C 23/00* (2006.01)

(52) U.S. Cl. ............... 340/447; 340/457.1; 340/439

(58) Field of Classification Search .......... 340/447, 340/426.33, 442, 444, 440, 448–449, 457.1, 340/465–466, 438–439
See application file for complete search history.

(56) References Cited

U.S. PATENT DOCUMENTS

| | | | | |
|---|---|---|---|---|
| 6,683,537 | B2 * | 1/2004 | Starkey et al. | 340/870.16 |
| 6,739,195 | B2 * | 5/2004 | Evans et al. | 73/598 |
| 7,116,213 | B2 * | 10/2006 | Thiesen et al. | 340/10.1 |
| 7,257,426 | B1 * | 8/2007 | Witkowski et al. | 455/569.2 |
| 7,284,418 | B2 * | 10/2007 | Yin et al. | 73/146.8 |
| 7,456,596 | B2 * | 11/2008 | Goodall et al. | 318/568.12 |
| 2005/0204806 | A1 * | 9/2005 | Brusarosco et al. | 73/146 |
| 2007/0069877 | A1 * | 3/2007 | Fogelstrom | 340/442 |
| 2007/0080795 | A1 * | 4/2007 | Ichikawa et al. | 340/447 |
| 2008/0202624 | A1 * | 8/2008 | Hajiaghajani | 141/1 |

* cited by examiner

*Primary Examiner* — Daniel Previl
(74) *Attorney, Agent, or Firm* — Patterson Thuente Christensen Pedersen, P.A.

(57) ABSTRACT

The invention is related to intelligent tire systems and methods. In one embodiment, an intelligent tire system (ITS) comprises a first sensor device, a second sensor device, a central control unit, and a transceiver. The first sensor device is mounted in a tire of a vehicle and comprises a radio frequency (RF) transmitter. The second sensor device is mounted in the tire and comprises an RF transceiver, the second sensor device adapted to receive a transmitter transmission from the first sensor device comprising first sensor data. The central control unit is mounted in the vehicle. The transceiver is mounted in the vehicle and is adapted to receive a transceiver transmission from the second sensor device comprising first sensor data and second sensor data and to transmit the transceiver transmission to the central control unit.

22 Claims, 3 Drawing Sheets

INTELLIGENT TIRE SYSTEMS AND METHODS

FIELD OF THE INVENTION

The invention generally relates to intelligent tire systems. More particularly, the invention relates to sensor networks implemented in vehicle tires or other structures.

BACKGROUND OF THE INVENTION

Tire pressure monitoring systems (TPMS) are used to monitor conditions within and surrounding vehicle tires. Parameters typically monitored include local temperature and pressure information. Most TPMS comprise tire-based sensors and other components that monitor and then transmit the local information via radio signals to a central receiver in another part of the vehicle. Power is supplied to the tire-based systems by local batteries, energy harvesters or scavengers, or other means.

To further improve vehicle and transportation safety, it is desired to monitor and transmit additional parameters, such as the form and size of a tire bearing surface, the depth of a tire tread profile, the temperature of the bearing surface, the stress in the tire due to acceleration or centrifugal force effects in curves, and other characteristics. It is desired to measure and monitor these and other conditions and characteristics, for example, in next-generation intelligent tire systems (ITS). The type and amount of information that can be monitored and transmitted by current systems and technologies, however, are limited by the power required locally in or around the tire to carry out these tasks, in particular the power necessary to wirelessly exchange communications with the central receiver some distance away.

SUMMARY OF THE INVENTION

The invention is related to intelligent tire systems and methods. In one embodiment, an intelligent tire system (ITS) comprises a first sensor device, a second sensor device, a central control unit, and a transceiver. The first sensor device is mounted in a tire of a vehicle and comprises a radio frequency (RF) transmitter. The second sensor device is mounted in the tire and comprises an RF transceiver, the second sensor device adapted to receive a transmitter transmission from the first sensor device comprising first sensor data. The central control unit is mounted in the vehicle. The transceiver is mounted in the vehicle and is adapted to receive a transceiver transmission from the second sensor device comprising first sensor data and second sensor data and to transmit the transceiver transmission to the central control unit.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
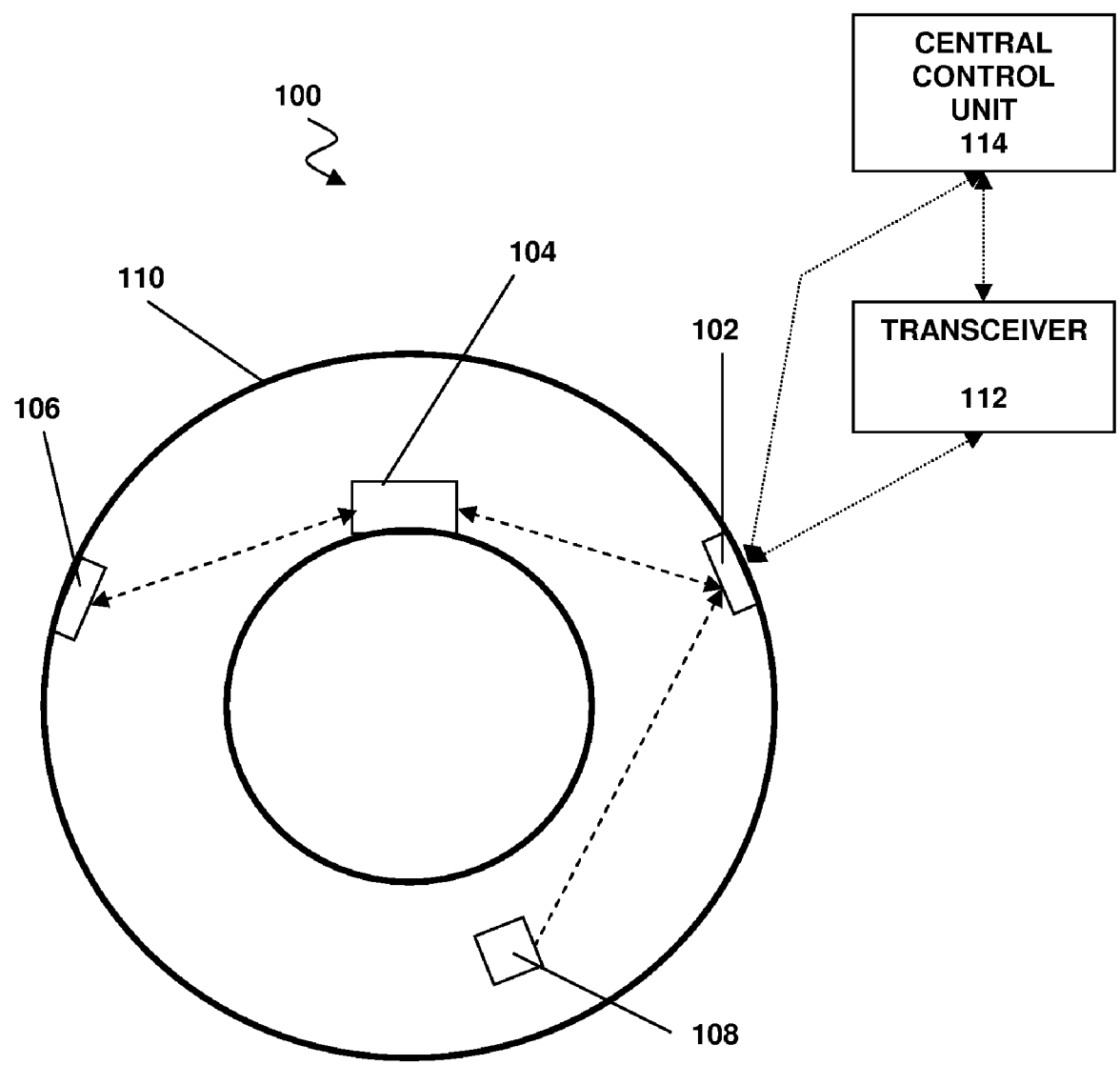
FIG. 1 depicts an intelligent tire system according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to sensor networks, such as sensor networks implemented in and about vehicle tires. Various embodiments of the invention can reduce transmission time and energy requirements between tire-based components and a central receiver, enhancing the overall capabilities of next-generation ITS or other system capabilities. The invention can be more readily understood by reference to FIGS. 1-3 and the following description. While the invention is not necessarily limited to the specifically depicted application(s), the invention will be better appreciated using a discussion of exemplary embodiments in specific contexts.

Referring to FIG. 1, one embodiment of an intelligent tire system (ITS) 100 implemented in a vehicle is depicted. ITS 100 comprises a plurality of sensor devices 102, 104, 106, 108 mounted on or about a wheel or tire 110, a transceiver 112, and a central control unit 114. ITS 100 optionally comprises additional tire- or vehicle-mounted components (not shown) for storing data, transmitting communications, and carrying out other functions. Further, while FIG. 1 depicts four sensor devices 102-108, ITS 100 can comprise more or fewer sensor devices in other embodiments, arranged in configurations other than the example depicted and described in more detail below.

Sensor devices 102-108 can each comprise one of a variety of sensor types, such as pressure, inertia, acceleration, temperature, magnetic, stress, and others. Each sensor device 102-108 is mounted in or on tire 110 at a point suited for taking measurements associated with the respective sensor type or application. In one embodiment, each sensor device 102-108 further comprises a transmission interface (not shown). The transmission interface can comprise a radio frequency (RF) transponder adapted to send and/or receive communications. In one embodiment, the RF transponder is a short-range transponder, adapted to transmit information between or among sensor devices 102-108 or other points within tire 110. Such short-range transmissions generally require less power than transmissions sent to a central receiver or other points in the vehicle.

Each of the plurality of sensor devices 102-108 is adapted to send data transmissions, while at least one of the plurality of sensor devices 102-108 can be further adapted to receive and retransmit data in one embodiment. More specifically, sensor device 102 comprises an acceleration sensor adapted to measure acceleration at a bearing surface or tread of tire 110. Sensor device 102 also comprises a transceiver for receiving transmissions within tire 110 and transmitting data at ranges external to tire 110. Sensor device 104 comprises a sensor for tire pressure and temperature measurement and includes a transceiver for short ranges within tire 110 and possible further transmissions. Sensor device 106 can comprise a temperature sensor for measuring a temperature of the bearing surface of tire 110 and, similar to sensor device 104 equipped with a transceiver for short ranges within the tire. Sensor device 108 is a stress sensor adapted to detect stress in the sidewall of tire 110 and comprises a short range transponder. Sensor device 104 is adapted to receive transmissions from at least sensor device 106 and additionally to transmit to sensor device 102. Sensor device 102 is adapted to receive transmissions from sensor devices 104 and 102 and further to transmit external to tire 110. As previously mentioned, other sensor types and configurations can be implemented in other embodiments of the invention, the particular sensor arrangement described herein being exemplary of only one embodiment.

Transceiver 112 is external to tire 110 and is adapted to pass data received from within tire 110 to central control unit 114. In the embodiment of FIG. 1, transceiver 112 receives data from sensor device 102 and subsequently transmits this data to central control unit 114. In one embodiment, transceiver 112 is part of central control unit 114, incorporated directly on the board of central control unit 114. In another embodiment, transceiver 112 can be physically intermediate tire 110 and central control unit 114, such as in the wheel housing, and can transmit data to central control unit 114 by RF, a galvanic connection, or another means. In a related embodiment, transceiver 112 can be adapted to radiate a signal around sensor device 102 to determine where sensor device 102 is on the radius as tire 110 rotates. Additionally, sensor device 102 can determine the strength of the signal radiated by and received from transceiver 112 and transmit its own data back at a maximum or high point, which could coincide with a minimum physical distance between sensor device 102 and transceiver 112 during rotation of tire 110, to further minimize the transmission power required by sensor device 102. Further, if a transceiver 112 is located in the wheel housing of each tire 110 of a vehicle, transceiver 112 could be used to localize the individual tires according to a particular field strength at each tire 110.

In another embodiment, transceiver 112 is intermediate the sensor devices located in at least one tire 110 and central control unit 114, while the sensor devices in at least one other tire 110 communicate directly with central control unit 114. Such a configuration could be used when central control unit 114 is located closer to, for example, the two front tires of a vehicle, permitting shorter-range direct communications between the sensor devices located at those two tires, while transceiver 112 is used to hop signals from the sensor devices in the rear tires.

In yet another embodiment, transceiver 112 is omitted. Embodiments including transceiver 112, however, generally require lower transmitting power by sensor device 102 to communicate with central control unit 114 because sensor device 102 needs only transmit to intermediate transceiver 112 rather than all the way to central control unit 114.

Figure 2:
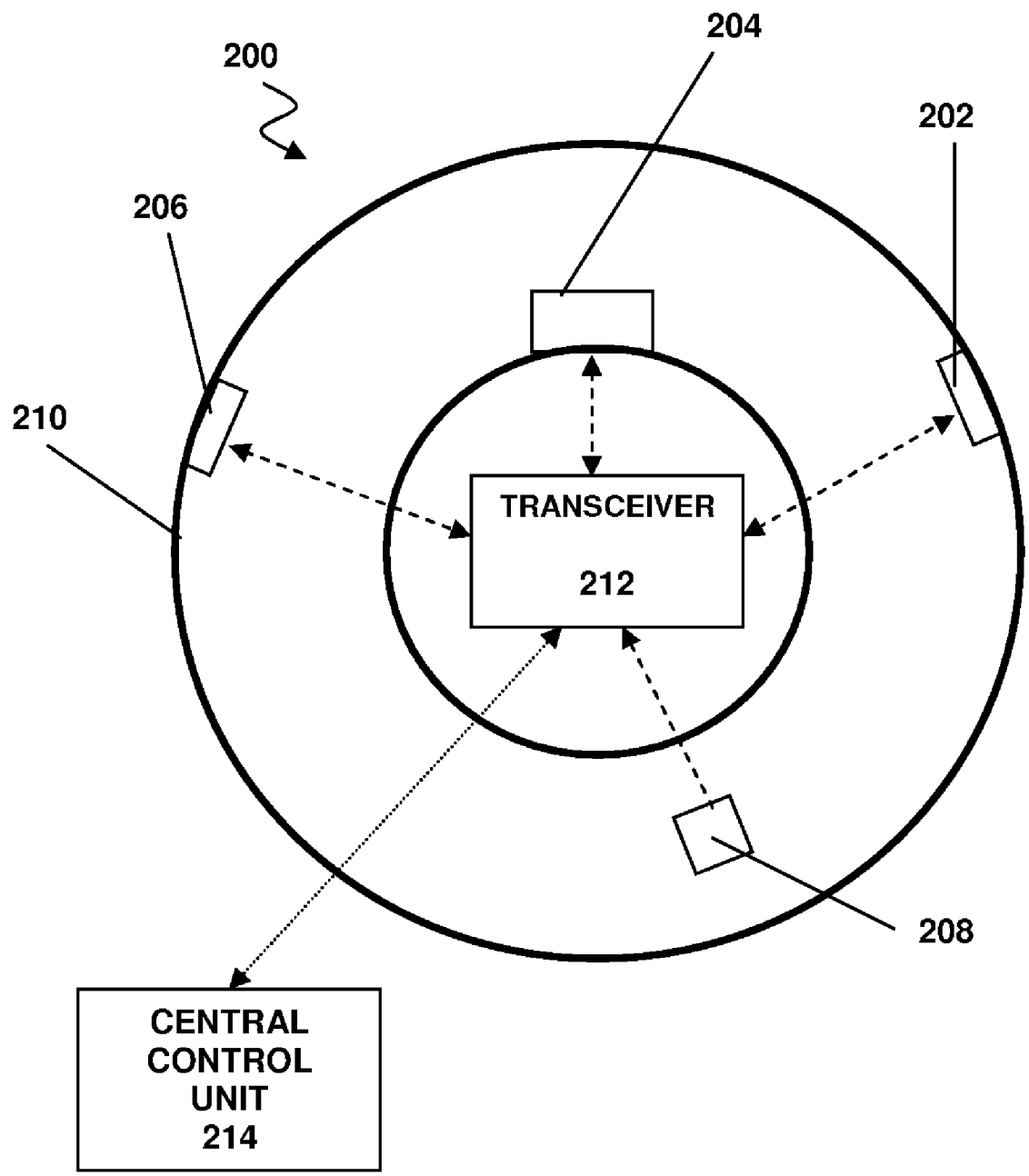
FIG. 2 depicts an intelligent tire system according to an embodiment of the invention.

Referring to FIG. 2, another ITS 200 according to an embodiment of the invention is depicted. ITS 200 comprises a spoked or star-like configuration of a plurality of sensor devices 202-208 arranged about transceiver 212 disposed near the center of wheel or tire 210. Similar to ITS 200 and sensor devices 102-108, each of the plurality of sensor devices 202-208 can comprise one of many sensor types and includes a one- or two-way transponder. As depicted, sensor devices 202, 204, and 206 comprise two-way transponders to both send and receive communications with transceiver 112, while sensor device 208 comprises a one-way transponder to send communications to transceiver 212. Other combinations and configurations of one- and two-way transponders are possible in other embodiments of ITS 200. In ITS 200, each sensor device 202-208 requires lower transmission power because only short-range transmissions are needed to communicate with transceiver 210, with a range in one embodiment extending to the axle or outside of the rim. Transceiver 210 can then communicate with central control unit 214.

Figure 3:
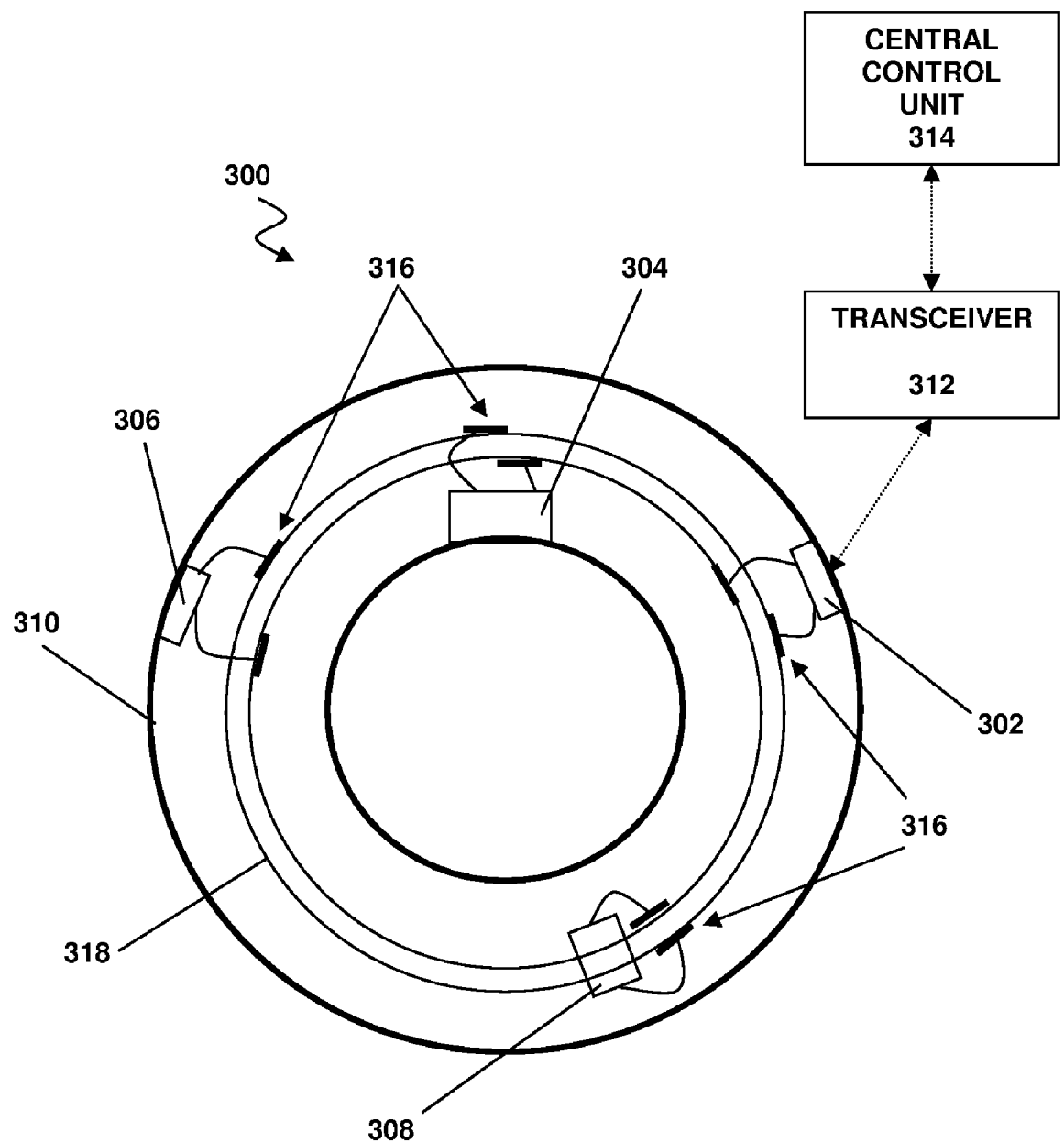
FIG. 3 depicts an intelligent tire system according to an embodiment of the invention.

Referring to FIG. 3, yet another embodiment of an ITS 300 according to the invention is depicted. Similar to ITS 100 and ITS 200 previously described, ITS 300 comprises a plurality of sensor devices 302-308 mounted in or on a tire 310. Data from sensor devices 302-308 is communicated to a transceiver 312 and central control unit 314, although in one embodiment transceiver 312 is optional and sensor devices 302-308 communicate directly, in one way or another as previously described, with central control unit 314. Each of the plurality of sensor devices 202-208 can comprise one of many sensor types, as previously mentioned regarding ITS 100 and ITS 200.

In ITS 300, each of the plurality of sensor devices 302-308 is capacitively coupled (at 316) to two leads 318 embedded within tire 310. RF signal communications in ITS 300, and thereby the required power, are reduced as sensor devices 302-308 can utilize the embedded network formed by leads 318 to communicate. In other embodiments of ITS 300, at least one of the leads 318 can be replaced by the rim or by the steel belt in the bearing surface of tire 310. This position in the center is advantageous due to lower centrifugal forces and thus permits use of a larger battery, a macroscopic energy harvester, or large coils for LF power transmission in transceiver 212. In yet another embodiment, a combination of an embedded network, such as ITS 300, and a radio frequency network within a tire, such as ITSs 100 and 200, can be used to efficiently communicate information among and from individual sensor devices to a central control unit.

Sensor networks, such as those described with reference to ITSs 100, 200, and 300 in FIGS. 1-3, reduce the power required to communicate data and information between a vehicle tire and a central control unit while increasing the amount and types of information that can be transmitted. The transmitted data and information can then be utilized by the central control unit to improve vehicle and occupant safety, such as by warning the driver of unstable or altered road conditions, reduced tire pressure, rapidly decreasing tire pressure, changed tire temperature, changing tire or vehicle performance, tire wear, vehicle load, and many other conditions detectable in or at the tire and affecting the overall safety and performance of the vehicle.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:
1. An intelligent tire system (ITS) comprising:
   a first sensor device mounted in a tire of a vehicle and comprising a radio frequency (RF) transmitter, the first sensor device configured to sense first sensor data;
   a second sensor device mounted in the tire and comprising an RF transceiver communicatively coupled to the RF transmitter to receive a transmitter transmission from the first sensor device comprising the first sensor data, the second sensor device configured to sense second sensor data;

a central control unit mounted in the vehicle; and a transceiver mounted in the vehicle and communicatively coupled to the RF transceiver to receive a transceiver transmission from the second sensor device comprising the first sensor data and the second sensor data and to transmit the transceiver transmission to the central control unit.

2. The ITS of claim 1, wherein the RF transmitter is configured to transmit transmissions in a first range, and wherein the RF transceiver is configured to transmit transmissions in a second range longer than the first range.

3. The ITS of claim 1, wherein the transceiver is mounted intermediate the tire and the central control unit.

4. The ITS of claim 1, wherein the transceiver is integrated with the central control unit.

5. The ITS of claim 1, wherein the transceiver is mounted proximate the tire.

6. The ITS of claim 1, wherein the first and second sensor devices are selected from the group consisting of a pressure sensor, an inertia sensor, an acceleration sensor, a stress sensor, a temperature sensor, and a magnetic sensor.

7. The ITS of claim 1, wherein the transceiver is configured to galvanically transmit the transceiver transmission to the central control unit.

8. The ITS of claim 1, further comprising a plurality of first sensor devices mounted in the tire of the vehicle, each first sensor device comprising an RF transmitter communicatively coupled to the RF transceiver to transmit first sensor data to the second sensor device.

9. The ITS of claim 1, wherein the transceiver is configured to radiate a signal toward the tire to determine a position of the second sensor devices on a rotational radius of the tire.

10. The ITS of claim 9, wherein the second sensor device is configured to determine a signal strength of the signal radiated by the transceiver and to send the transceiver transmission when the signal strength is high.

11. An intelligent tire system (ITS) comprising:
a first sensor to sense a first condition related to a tire and comprising a wireless transmitter;
a second sensor to sense a second condition related to the tire and comprising a wireless transceiver to receive data related to the first condition from the first sensor; and
a central control unit to receive data from the second sensor, the data related to the first condition and the second condition.

12. The ITS of claim 11, further comprising a transceiver, wherein the central control unit is communicatively coupled to the transceiver to receive data from the second sensor via the transceiver, the data related to the first condition and the second condition.

13. An intelligent tire system (ITS) comprising:
a sensor network comprising a plurality of sensors disposed in a tire;
a transceiver mounted external to the tire and wirelessly coupled to the wireless sensor network by at least one of the plurality of sensors; and
a controller coupled to the transceiver,
wherein at least one of the plurality of sensors comprises a transceiver to receive data from others of the plurality of sensors and to transmit the data to the transceiver.

14. The ITS of claim 13, wherein each of the plurality of sensors comprises a short-range transmitter.

15. The ITS of claim 13, wherein the controller is wirelessly coupled to the transceiver.

16. The ITS of claim 13, wherein the transceiver is integrated with the controller.

17. The ITS of claim 13, wherein the plurality of sensor devices are wirelessly coupled to form the sensor network.

18. An intelligent tire system (ITS) comprising:
a sensor network comprising a plurality of sensor devices disposed in a tire;
a lead embedded in the tire, wherein each of the plurality of sensor devices is capacitively coupled to the lead to form the sensor network;
a transceiver wirelessly coupled to the wireless sensor network by at least one of the plurality of sensor devices; and
a controller coupled to the transceiver.

19. The ITS of claim 18, wherein the lead comprises a steel belt of the tire.

20. A method of monitoring a condition related to a tire in a vehicle comprising the steps of:
sensing information about a first condition related to the tire by a first sensor in the tire;
sensing information about a second condition related to the tire by a second sensor in the tire;
transmitting the information about the first condition from the first sensor to the second sensor; and
transmitting the information about the first and second conditions from the second sensor to a controller in the vehicle, wherein a transmitting power of the second sensor is greater than a transmitting power of the first sensor.

21. The method of claim 20, wherein the step of transmitting the information about the first and second conditions from the second sensor to a controller in the vehicle further comprises transmitting the information via a transceiver intermediate the second sensor and the controller.

22. A method of monitoring a tire of a vehicle comprising the steps of:
sensing information about a plurality of conditions related to the tire by a plurality of sensors mounted in the tire;
collecting the information at one of the plurality of sensors;
transmitting the information from a short-range transmitter of the one of the plurality of sensors to a transceiver mounted proximate the tire; and
transmitting the information from a long-range transmitter of the transceiver to a central control unit in the vehicle.

* * * * *